Dec. 23, 1947.  H. T. STILL  2,433,170
STAND FOR SMOKERS' PIPES AND THE LIKE
Filed Nov. 15, 1945
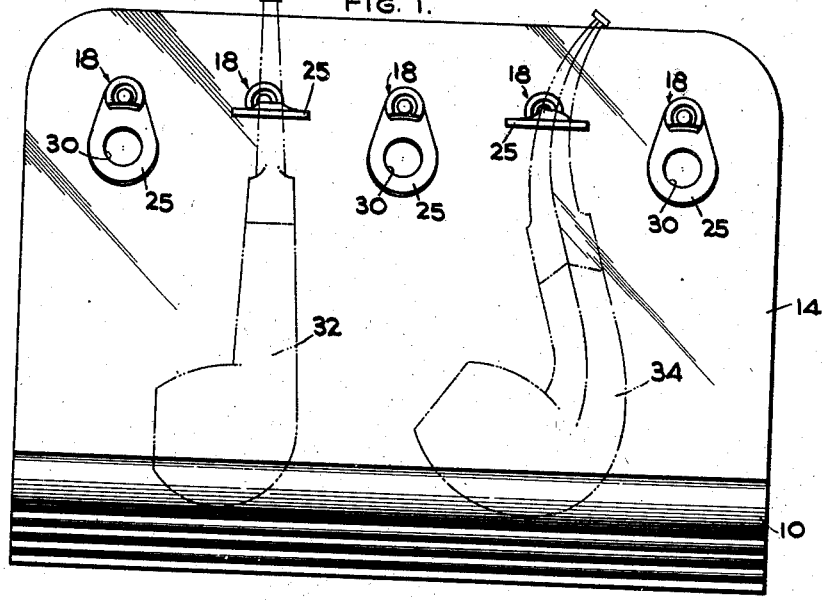
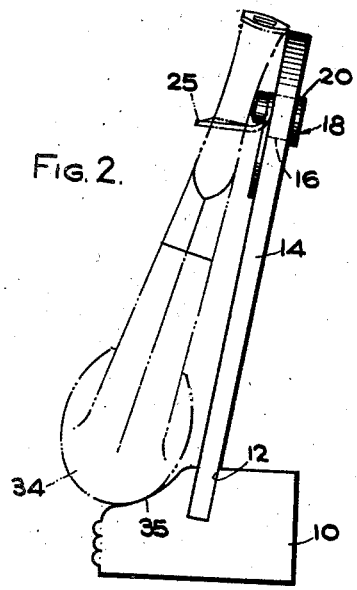
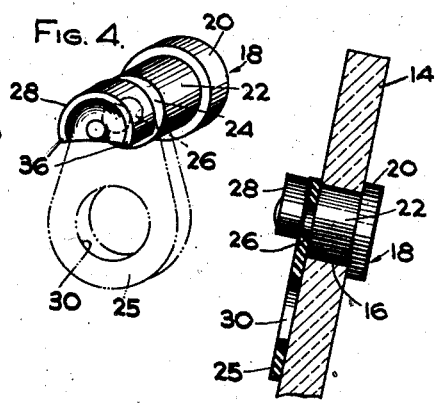
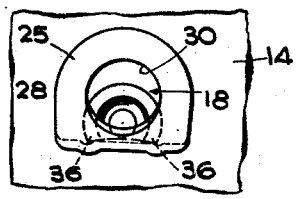
INVENTOR.
HOBART T. STILL
BY
Bean, Brooks, Buckley & Bean.

Patented Dec. 23, 1947

2,433,170

UNITED STATES PATENT OFFICE 2,433,170

STAND FOR SMOKERS' PIPES AND THE LIKE

Hobart T. Still, Kenmore, N. Y.

Application November 15, 1945, Serial No. 628,894

2 Claims. (Cl. 211—60)

This invention relates to holders for smokers' pipes and the like, and more particularly to improvements in holders such as are adapted to support a collection of variously styled smokers' pipes; fountain pens; cigarette holders; or similar stemmed articles; to be employed as display stands for pipes and the like for storage and/or merchandising purposes.

One of the objects of the invention is to provide a display holder for pipes or like articles, having stem engaging means of improved form. Another object of the invention is to provide in such holders an improved stem engaging means of structurally simple and rugged form and which is adapted to be manufactured inexpensively. Another object of the invention is to provide a pipe display stand for the purposes aforesaid which is of improved appearance. Another object of the invention is to provide a pipe display stand for the purposes aforesaid which embodies improved form of pipe stem engaging means adapted to receive with equal facility variously styled and dimensioned pipes and the like. Other objects and advantages of the invention will appear from the specification hereinafter.

In the drawing:

Fig. 1 is a front elevation of a pipe stand of the invention illustrating the mode of mounting smokers' pipes thereon;

Fig. 2 is an end elevation thereof;

Fig. 3 is a fragmentary section, on an enlarged scale, through one of the pipe engaging devices thereof;

Fig. 4 is a perspective of one of the pipe engaging devices alone; and

Fig. 5 is a fragmentary front elevation, on a larger scale, of a portion of the pipe rack of Fig. 1, showing one of the pipe engaging devices thereof in elastically deformed position.

The drawings illustrate the invention to be embodied in a pipe rack or display stand comprising a base block 10 which may be formed of wood or metal or plastic or any other suitable material and to be ornamentally finished in any manner desired. The base block 10 is grooved as indicated at 12 (Fig. 2) to receive in press-fitted relation therein the lower edge of the display stand panel 14 which may also be formed either of plastic or wood or metal, or other suitable material as may be preferred. The panel 14 is formed with a series of perforations as indicated at 16 so as to be adapted to receive pins 18 in inserted relation therein.

The pins 18, as illustrated in detail in Figs. 3–4, are headed at their rear ends 20 to prevent passage thereof through the panel openings 16. The body portion 22 of each of the pins is dimensioned to slide-fit into and to occupy the spaces within the openings 16, and immediately forwardly of the body portions 22 the pins are annularly recessed as indicated at 24 (Fig. 4). An elastic tab 25 formed of rubber or any other suitably pliable material is provided for each of the pins 18; the tabs 25 being formed each with an opening 26 therein whereby to adapt the tab to be slipped upon the forward end of the corresponding pin so as to encircle the latter in gripping relation. The openings 26 in the tabs 25 are dimensioned to substantially complement the reduced diameter portions of the pins in the regions of the recesses 24 therein, and thus it will be appreciated that the tabs are adapted to be stretched over the forward end head portions 28 of the pins until they slip into the grooves 24 thereof, whereupon the tabs will be disposed to lie against the panel 14 while mechanically locking the pins in mounted position upon the panel.

In each case the aperture 26 is located adjacent one end of the tab 25 and a larger aperture as indicated at 30 is formed through the tab at the other end thereof; the aperture 30 being dimensioned so as to permit frictionally threading therethrough of the stem of a pipe or the like to be mounted upon the display stand in the manner indicated in Figs. 1–2. The smokers' pipes in Figs. 1–2 are designated 32 and 34 respectively. As shown in Figs. 1–2, the base block 10 is preferably bevelled in somewhat concave fashion as indicated at 35, so as to provide an improved resting place for the bowl portions of the pipes mounted upon the display stand.

As shown in Figs. 1, 4, 5, the front end portions 28 of the pins 18 are cut off at the bottoms thereof to provide in each case a slightly concave undersurface terminating in points 36—36 (Figs. 4–5). Thus, it will be appreciated that whenever the free ends of the tabs 25 are manually lifted so as to dispose the lower portions thereof horizontally for mounting pipe stems or the like therein, the points 36—36 will lock the tabs against accidental displacement from the pins.

It will also be understood that although only one form of the invention has been shown and described in detail it will be apparent to those skilled in the art that the invention is not so limited but that various changes may be made therein without departing from the spirit of the invention or the scope of the appended claims.

I claim:

1. A display stand comprising a panel and a pin headed at one end and slip-fitted through an apertured portion of said panel into mounted position thereon with the headed end portion of the pin bearing against one side of said panel, said pin being grooved adjacent its end opposite its headed end, and an elastic tab having a pair of openings, one of said tab openings being stretched about and mounted within said pin grooved portion for locking said tab upon said pin and said pin upon said panel, the other of said tab openings being adapted to frictionally receive a stemmed article therein, said pin being concave shaped at its under surface portion to provide a pair of spaced points adapted to engage said tab when being pulled upon and flexed upwardly to prevent accidental displacement of said tab from said pin grooved portion.

2. A display stand comprising a panel and a pin slip-fitted thereon to extend from a side thereof, said pin being grooved adjacent its end, and an elastic tab having a pair of openings, one of said tab openings being stretched about and mounted within said pin grooved portion for locking said tab upon said pin and said pin upon said panel, the other of said tab openings being adapted to frictionally receive a stemmed article therein, said pin being concave shaped at its under surface portion to provide a pair of spaced points adapted to engage said tab when being pulled upon and flexed upwardly to prevent accidental displacement of said tab from said pin grooved portion.

HOBART T. STILL.

REFERENCES CITED

The following references are of record in the file of this patent:

UNITED STATES PATENTS

| Number | Name | Date |
|---|---|---|
| 2,221,801 | Keppinger | Nov. 19, 1940 |
| 2,119,520 | Brokering | June 7, 1938 |